Aug. 29, 1939.  F. W. DEARBORN  2,171,288
COUPLER FOR TRAIN PIPES
Filed Aug. 18, 1937  2 Sheets-Sheet 1
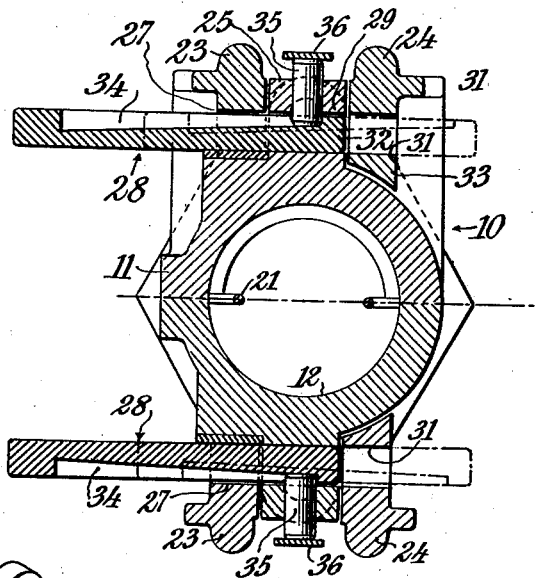
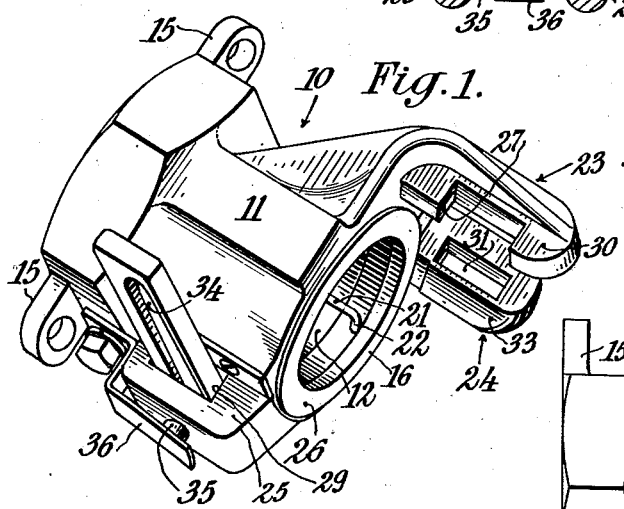
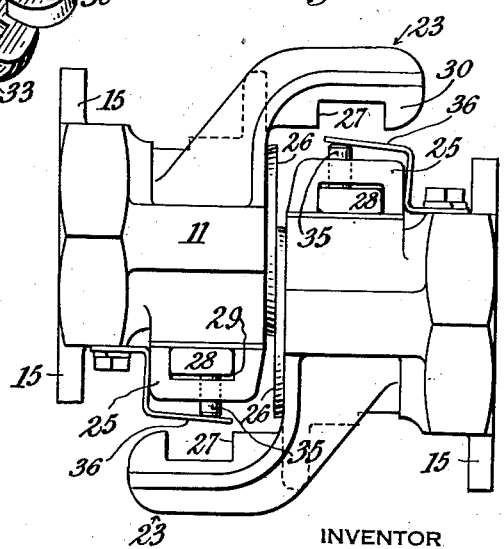
INVENTOR
Frank W. Dearborn,
BY
Fraser, Myers & Manley
ATTORNEYS.

Aug. 29, 1939.    F. W. DEARBORN    2,171,288
COUPLER FOR TRAIN PIPES
Filed Aug. 18, 1937    2 Sheets-Sheet 2
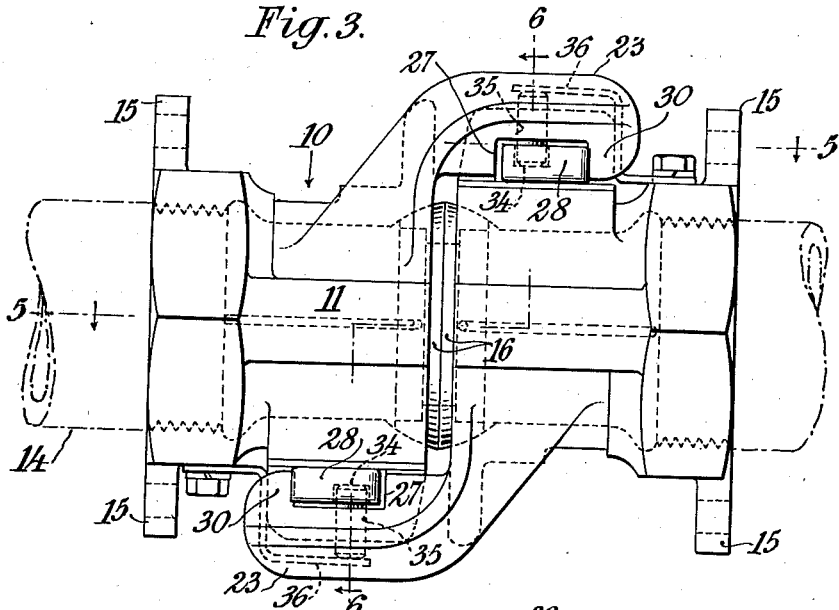
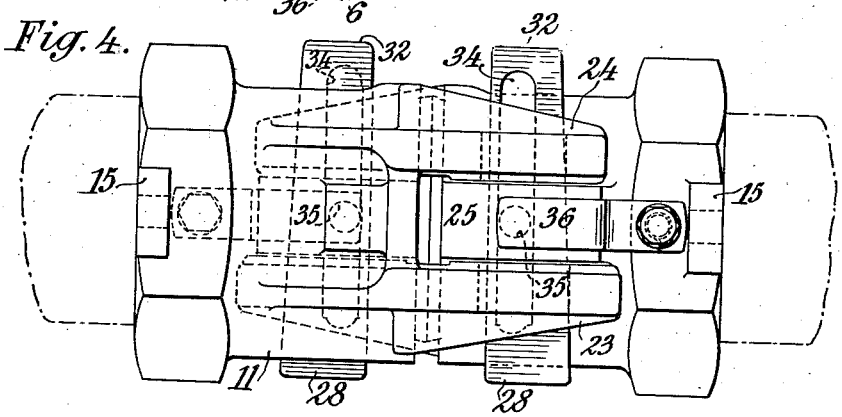
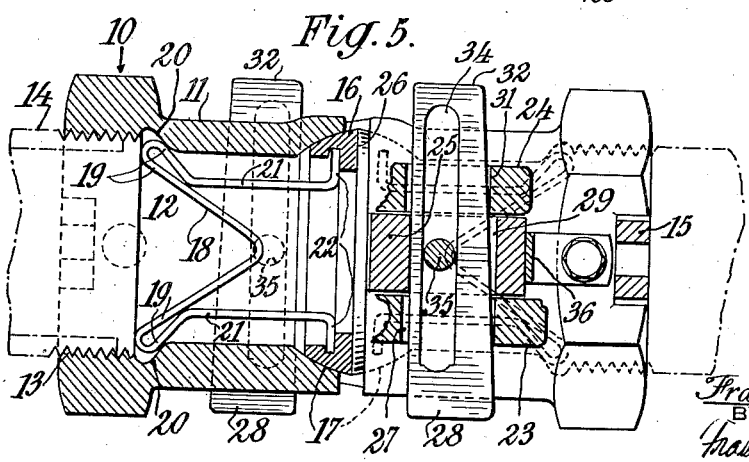
INVENTOR
Frank W. Dearborn
BY
ATTORNEYS.

Patented Aug. 29, 1939

2,171,288

UNITED STATES PATENT OFFICE 2,171,288

COUPLER FOR TRAIN PIPES

Frank W. Dearborn, Brooklyn, N. Y., assignor to Gold Car Heating & Lighting Company, Brooklyn, N. Y., a corporation of New York Application August 18, 1937, Serial No. 159,633

8 Claims. (Cl. 285—60)

This invention relates to improvements in hose couplings, or the like, of the type particularly adapted, although not specifically limited, for use in connecting the steam, air and other pipes of one railroad car to those of another; and in its more particular aspects, to a positive locking device for holding a pair of substantially identical couplings in mating relation against all but positive and intentional disengagement.

In recent years, and with the advent of improved equipment for railroad cars, the quantity of steam and compressed air used on them has greatly increased. Moreover, much of this equipment operates satisfactorily only with high pressure steam, and is more than ordinarily sensitive to variations in pressure from a set standard. The foregoing, along with the fact that more and more cars have been added to trains, has made it increasingly necessary to provide both larger and stronger fluid distributing pipes on the cars, and to reduce frictional losses in the pipes to a minimum. Where formerly, for example, a two-inch line was entirely adequate, a three or four inch one must now be used; and it seems entirely likely that even larger ones may soon be demanded. The couplings for such lines must be much heavier than those now available, and the handling of them in joining, locking, etc., presents problems which are not now encountered. As an illustration of this, it is evident that a trainman would have little or no trouble in grasping a pair of two-inch coupling members, each weighing a pound or two, and twisting them into locking relation. He would, however, be hard put to juggle and connect a pair of similarly constructed, four and a half inch members, weighing ten or twelve pounds apiece.

The principal object of the invention is to provide a coupling for railroad car pipes or the like having a capacity sufficient to meet both present day needs and some possible future demand, and yet one comprising a pair of substantially identical members which, though of some considerable size, and weight, may fairly easily be connected and locked together.

It is a more specific object of the invention to provide a coupling member of this character having heel and overhanging toe portions which may be interlocked with the toe and heel portions, respectively, of an identical coupling member by very simple, straight-line movements—not complicated, eccentric twisting ones— when the members are placed in end to end relation and their fluid orifices brought into registry.

A further object of the invention resides in the provision of a coupling member, constructed in accordance with the foregoing, and having in addition a wedge element extending cross-wise of its heel so as to be capable of engaging the toes of a reciprocal member to lock the two together; and in the provision of means for retaining this wedge at all times as a part of the member itself.

The full nature of the invention, along with other objects and various features thereof, will be more apparent from a consideration of the following description in the light of the accompanying drawings, in which, Figure 1 is a perspective view of a coupling member constructed in accordance with the principles of the present invention;

Fig. 2 is an elevational view of a pair of members of the type shown in Fig. 1, disposed in end to end relation, and partially translated into interlocking position.

Fig. 3 is a similar view of the members of Fig. 2 joined and appropriately locked together;

Fig. 4 is a plan view of the members of Fig. 2; and

Figs. 5 and 6 are sectional views taken on the lines 5—5 and 6—6, respectively, of Fig. 3.

The coupling member 10, as may best be seen in Figs. 1 and 5, comprises a body 11 of generally cylindrical proportions, having a central passageway 12 extending in a straight line from its inlet to its discharge end, and heel and toe portions which may be matched and interlocked in a manner later to be considered. The inlet end of the body may be formed in any conventional manner so that it may be attached to the end of a supporting hose or pipe carried by a railroad car, for example. Usually it is internally threaded, as at 13, for the reception of the threaded nipple or pipe 14, and is additionally provided with radially extending flanges 15 for cooperation with the similarly flanged connector when desired. The outlet end, too, is of somewhat conventional design, having, for example, a bronze or brass seat element 16 disposed within the bell-mouth 17 of the body with its outer spherical surfaces matching those of the mouth, and held in that position by an appropriate spring element 18. The latter element, as can best be seen in Fig. 5, comprises a single piece of wire bent back and forth upon itself so as to have two projecting legs 19 capable of engaging and seating against appropriate undercut surfaces 20 of the body, and a pair of arms 21 provided with out-turned fingers which extend into a peripheral groove formed on the inner surface of the seat member 16. With this arrangement the spring holds the seat in place, and yet permits substantially universal adjustment of that member with respect to the body of the coupling, all in the well understood manner.

In order to couple a pair of members of the type generally described above, they are first placed in end to end relation as shown in Figure 2 with the pair of arms 23, 24 of each overlapping the heel 25 of the other, and with the end surfaces 26 of the respective seat members engaging one another. Then, by a simple transverse movement, they may be brought to position as shown in Figs. 3, 4 and 6. In those figures it will be seen that the heel 25 of each member lies in the fork between the respective overhanging arms 23 and 24 of the other, and hence prevents rotative movement of one with respect to the other; and further, that one of them, 23, has an open U-shaped slot 27 in its inner face which is complemental to the transversely movable wedge 28 carried in the opening 29 of the heel. Hence the toe 30 of this arm overlaps the wedge in such position as to be engaged by the rear face of the latter member. The other of the arms, 24, is somewhat deeper than the first mentioned one, and, as may be seen particularly in Figs. 1 and 6, it has a transverse slot 31 which registers with the transverse opening 29 in the heel, and hence, with the small end 32 of the wedge member 28 when this wedge is in the full line position of Fig. 6. Accordingly, when the members are in this position they can readily be locked in place by driving the wedges home to the dotted line position of Fig. 6—that is, until their ends protrude through the openings in the arms 24, and their sides engage the opposing surfaces of the toes of the arms, thus to draw the members firmly together. If, during this process, the wedge of one is driven in further than that of the other, it is evident that the two members will not be exactly aligned, that is, their axes will meet at a slight angle. That fact, however, makes little or no difference, for their respective seats 16, being universally movable, readily adjust themselves to a variety of conditions and their end faces 26 match and form a leak-tight joint.

It can be appreciated that the arm 24 might be made identical with the arm 23 if that were desired. In such case the wedge 28, when driven home, would engage the toes and hold the parts together against axial separation. Such an arrangement, however, is not preferred for it provides no means, other than frictional engagement between the wedge and the surfaces of the heels and toes, for preventing movement of one coupling transversely of the other, a thing that could readily occur as the result of continual swing and vibration imparted to the couplings by movement of the train which carries them. In the preferred arrangement, which has been shown and described, any such accidental disengagement is impossible for the interlocking of the toe portions of each arm with the wedges prevents axial movement, the forking of the heels by the pairs of arms prevents any rotative movement, and the inner part 33 of each arm 24 precludes the possibility of transverse movement of one of the couplings with respect to the other.

In the preferred embodiment of the invention, the wedge 28 is retained at all times as a part of the member itself. To accomplish this, the wedge is provided with a slot 34 (Fig. 6) in its outer surface which terminates somewhat short of each of its ends; and the heel of the member carries a retaining pin 35 having its inner end disposed within the slot 34 and held in that position by the leaf spring 36. With this arrangement it is necessary, however, before coupling a pair of these members, to withdraw their wedges 28 to the extreme position shown in full lines in Fig. 6 so that the inner part 33 of each of their overhanging arms 24 may pass and have their openings 31 aligned with the ends 32 of the wedges. Thereafter, the latter elements may be driven home as described.

From all of the foregoing it will be evident that the locking of one coupling member to another is of a very positive nature. When the wedges are fully inserted the ordinary frictional contact between their surfaces, and those of the heels and toes, should ordinarily be sufficient to prevent accidental displacement of the parts under almost any conditions. As a further precaution, however, tending to prevent shaking loose, it will be noted that the slot 34 of the wedge is inclined from one end towards the other; that is, it is shallow at its thin right-hand end, and becomes gradually deeper as it approaches its thickest (widest) left-hand end, all as viewed in Fig. 6. Accordingly, in moving the wedge from its locked toward its unlocked position, the pin 35 must be moved against the force of its retaining spring, and this, in combination with the very considerable frictional force between the contacting faces of the retaining pin and of the wedge, makes it all but impossible for the latter element to be moved by anything other than a hammer blow.

In joining a pair of these coupling members it will be noted that only simple, straight-line movements are necessary. Specifically, they are placed in end to end position and then, by a simple translatory movement, involving no twisting or turning, the arms of one are made to overlap the heel of the other for subsequent engagement by the wedge. That simple method of interlocking is of very considerable importance in handling large and heavy members, as will be readily apparent to those skilled in the art.

Another feature of this design is found in the fact that some considerable tolerance may be given to its matching parts. Specifically, it is not necessary that the slots in the arms 23, and the openings in the arms 24, register exactly with the transverse opening 29 in the heel 25. It is only essential that these parts be in general registry so that the wedge 28 may be driven into the desired engaging relation. Similarly, the fact that the wedge opening is somewhat larger than the wedge does not make any great difference since the spring-pressed pin 35 is always present to prevent the separation of the wedge from its particular member. Accordingly, one of these members may readily be coupled to another, even though the two differ slightly in size and shape.

Another great advantage which flows from this particular type of interlocking coupling is found in the fact that it may be used in a straight-line coupling, that is, one in which the fluid orifices are axially aligned with their supporting conduits. Such straight-lined connection, as will readily be apparent, results in considerably less frictional loss to the fluid passing therethrough. The position in which the various parts of the improved coupling are shown in the drawings and their description in such language as "upper", "lower", "over" and "under" is purely arbitrary, and is not intended to constitute any limitation upon the position which these parts occupy when the coupling members are attached to their supporting pipes. Any suitable arrangement may be adapted. For example, if they are used on railroad cars for connecting various train pipes, then it will probably be expedient to arrange the members in the conventional way with the toes and heels at the sides, and with the wedges in a vertical position, so that the cars may be reversed without interfering with the coupling.

Since certain changes may be made in the construction of the coupling without in any way departing from the principles of the present inven-

What I claim is:

1. A coupling member comprising a body having a fluid passage extending therethrough with a seat at one of its ends adapted to cooperate with an opposing similarly seated end of an adjacently disposed reciprocal coupling member to form a leak-tight joint; a pair of spaced locking arms formed on the outer side of the body and projecting beyond its seated end parallel to the axis of the body whereby to overlap the body of a reciprocal coupling member, said arms having transverse registering slots formed near their free ends for cooperation with a transversely disposed wedge of a reciprocal member, at least one of such slots being open along the inner face of the arm in which it is formed, a heel formed on the outer side of the body opposite the locking arms, said heel having a transverse opening therein, and being slightly lesser in width than the spacing between said locking arms whereby it may lie between similar arms of a reciprocal member; a locking wedge of tapering width extending through the transversely opening in the heel and adapted to be driven into the transverse slots in the locking arms of a reciprocal member to draw the two together; and means for limiting the movement of the wedge in the opening in said heel.

2. A coupling member comprising a body having a fluid passage extending therethrough with a seat at one of its ends adapted to cooperate with an opposing similarly seated end of a reciprocal coupling member to form a leak-tight joint; a pair of spaced locking arms formed on the outer side of the body and projecting beyond its seated end parallel to the axis of the body whereby to overlap the body of a reciprocal coupling member, said arms having registering transverse slots near their free ends for cooperation with a transversely disposed wedge of a reciprocal coupling member, one of said slots being open along the inner face of its arm and the other being closed along the like face of its arm; a heel formed on the outer side of said body opposite said locking arms, said heel having a transverse opening, and being slightly lesser in width than the spacing between said locking arms whereby it may lie between similar arms of a reciprocal coupling member; and a locking wedge of tapering width extending through the transverse opening in the heel and adapted to be driven into the transverse slots in the locking arms of a reciprocal coupling member to draw the two together.

3. A coupling member according to claim 2, further characterized in that the wedge has a slot in one of its faces extending lengthwise thereof and terminating short of each of its ends; and by the provision of a pin carried by the heel with its end disposed in the slot in the wedge to prevent the escape of said wedge.

4. A coupling member according to claim 2, further characterized in that the wedge has a slot in one of its faces extending lengthwise thereof, terminating short of each of its ends and progressively increasing in depth from the narrower towards the wider end of the wedge and by the provision of a pin passing through the heel with its end disposed in the slot in the wedge, and means for holding said pin in place.

5. A coupling member according to claim 2, further characterized in that the heel has a lateral opening therein, and the wedge has a slot in one of its faces extending lengthwise thereof, terminating short of each of its ends and progressively increasing in depth from points adjacent the narrower end toward the wider end of the wedge, and by the provision of a pin passing through the opening in the heel with its end disposed in the slot in the wedge, and a spring for pressing said pin into said slot.

6. A coupling according to claim 2 further characterized in that the wedge has a slot in its outer face extending lengthwise thereof and terminating short of each of its ends, and in that the heel has a radially disposed opening therein; and by the provision of a pin passing through the opening in the heel with its end disposed in said slot, and a spring for forcing said pin into said slot.

7. A coupling assembly comprising a pair of reciprocal coupling members disposed in end to end relation and each having a fluid passage extending axially therethrough; a seat disposed in the open end of the passage for cooperation with the like part of the adjacent member; a pair of spaced locking arms extending axially from one side of each body and overlapping the body of the other member and having registering transverse slots near their free ends; a heel extending from the opposite side of each body between the locking arms of the other member, and having transverse and radial openings therein; and a locking wedge of tapering width having a slot in its outer face which extends lengthwise, increases in depth from the narrow towards its wide end, and terminates short of each end thereof, one of said wedges being disposed in and movable through the transverse opening in the heel of each body and the slots in the locking arms of the other body so as to be capable of drawing one member endwise towards the other; a pin located in the radial opening of each heel with its end disposed in the slot in the wedge; and a spring for holding each such pin resiliently in place.

8. A coupling assembly comprising a pair of reciprocal couplers having fluid passages therein disposed in end to end relation to form a leak tight joint; a heel portion formed on one side of the body of each coupler with a transverse and a radial opening therein; a locking arm formed on the other side of the body of each coupler extending over the body of the other coupler in juxtaposition to the heel of such other coupler, each such arm having a transverse slot near its free end registering generally with the transverse slot in the adjacent heel; and a locking wedge of tapering width disposed in and movable through the transverse opening in the heel of each coupler and into the transverse slot in the adjacent locking arm so as to be capable of drawing one coupler towards the other, each such wedge having a slot in its outer face which extends lengthwise, increases in depth from the narrower towards the wider end and terminates short of each end thereof; a pin located in the radial opening of each heel with an end thereof disposed in the slot in the wedge in that heel; and a spring for holding such pin in place.

FRANK W. DEARBORN.